(12) United States Patent
Fougnies

(10) Patent No.: US 6,434,378 B1
(45) Date of Patent: *Aug. 13, 2002

(54) PRE-PAID CELLULAR TELEPHONE SYSTEM

(75) Inventor: Douglas V. Fougnies, Tempe, AZ (US)

(73) Assignee: Cellexis International, Inc., AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/104,420

(22) Filed: Jun. 25, 1998

Related U.S. Application Data

(63) Continuation of application No. 08/569,961, filed on Dec. 8, 1995, now Pat. No. 5,778,313.

(51) Int. Cl.$^7$ ............................................. H04M 11/00

(52) U.S. Cl. ...................... 455/406; 455/408; 455/411; 379/114.2; 379/127.06

(58) Field of Search ................................. 455/406, 408, 455/407, 409, 410, 418, 419, 564; 379/144, 114, 130, 113, 112, 127, 355, 356, 114.03, 114.01, 114.2, 114.16, 127.01, 127.02, 127.03, 127.06, 144.01

(56) References Cited

U.S. PATENT DOCUMENTS

| | | | |
|---|---|---|---|
| 3,920,908 A | 11/1975 | Kraus | 179/2 CA |
| 4,310,726 A | 1/1982 | Asmuth | 179/18 B |
| 4,680,785 A | 7/1987 | Akiyama et al. | 379/57 |

(List continued on next page.)

FOREIGN PATENT DOCUMENTS

| | | | |
|---|---|---|---|
| EP | 0-115-240 | 5/1988 | H04M/1/72 |

OTHER PUBLICATIONS

"Testimony of Scott Silvey, CAL PU Docket I.88–11–040" (Aug. 30, 1991).
CSI Switch to Radio–Based Cellular Carriers, LEC & IXC Interconnections (undated).
AT&T Technical Journal, Summer 1991; pp. 11–25, 44–57, and 72–84.
Proceedings of the IEEE, vol. 79, No. 1, Jan. 1991; pp. 7–20. (14 pages).
Bond, "Cellular Carriers Use Prepaid Programs to Reach Untapped Markets," Billing World, Mar. 1997, pp. 14–17.
Freedom Wireless, "The Freedom to Choose! Get Pre–Pay Cellular," sales pamphlet, undated.
MultiMedia Publishing Corp., "Prepaid Cellular and Prepaid Wireless Market Report and Forecast 1997–2002," sales literature, undated.
NEXTLINK, "Introducing a New Prepaid Telephone Service from NEXTLINK," sales literature, undated.
Open Development Corp., "openMEDIA Cellular Prepaid," sales literature, undated.
Tecore, Inc., "Pre–Paid Cellular", sales literature, Mar. 25, 1997, pp. 1–4.

*Primary Examiner*—Tracy Legree
(74) *Attorney, Agent, or Firm*—Fish & Richardson P.C.

(57) ABSTRACT

A pre-pay service unit uses pseudo-numbers to identify subscribers and substitutes actual numbers to complete a call after verification of authenticity and verification of a positive balance in a subscriber's account. The service unit and the cellular telephone exchange data in the process of authentication. For outgoing calls, a cellular telephone first transmits an "800" number and an ANI. The "800" number is the telephone number of the pre-pay service unit, which then requests number actually dialed. The cellular telephone responds with dialed digits, a security code, and status data. If the information is correct, the dialed digits are then passed to a local exchange carrier to complete the call. For incoming calls, a pseudo-number directs the call to the pre-pay service unit, which converts the pseudo-number to the actual telephone number of a subscriber's cellular telephone.

67 Claims, 4 Drawing Sheets

U.S. PATENT DOCUMENTS

| | | | |
|---|---|---|---|
| 4,706,275 A | | 11/1987 | Kamil |
| 4,756,020 A | | 7/1988 | Fodale |
| 4,776,000 A | | 10/1988 | Parienti |
| 4,776,003 A | * | 10/1988 | Harris ........................ 455/407 |
| 4,776,033 A | | 10/1988 | Scheinert |
| 4,831,647 A | | 5/1989 | D'Avello et al. |
| 4,845,740 A | | 7/1989 | Tokuyama et al. |
| 4,852,149 A | | 7/1989 | Zwick et al. ................. 379/67 |
| 4,860,341 A | | 8/1989 | D'Avello et al. |
| 4,901,340 A | | 2/1990 | Parker et al. |
| 4,935,956 A | | 6/1990 | Hellwarth et al. |
| 5,003,595 A | | 3/1991 | Collins et al. ................ 380/25 |
| 5,046,088 A | | 9/1991 | Margulies |
| 5,063,588 A | | 11/1991 | Patsiokas et al. ............. 379/57 |
| 5,103,449 A | | 4/1992 | Jolissaint |
| 5,127,040 A | | 6/1992 | D'Avello et al. |
| 5,138,650 A | | 8/1992 | Stahl et al. |
| 5,144,649 A | | 9/1992 | Zicker et al. |
| 5,159,625 A | | 10/1992 | Zicker ......................... 379/59 |
| 5,187,710 A | | 2/1993 | Chau et al. ................. 379/114 |
| 5,216,703 A | | 6/1993 | Roy ............................ 379/355 |
| 5,233,642 A | | 8/1993 | Renton |
| 5,265,155 A | | 11/1993 | Castro |
| 5,274,802 A | | 12/1993 | Altine |
| 5,276,444 A | | 1/1994 | McNair |
| 5,291,543 A | | 3/1994 | Freese et al. |
| 5,297,189 A | | 3/1994 | Chabernaud ................. 379/58 |
| 5,301,223 A | | 4/1994 | Amadon et al. |
| 5,301,234 A | | 4/1994 | Mazziotto et al. |
| 5,309,501 A | | 5/1994 | Kozik et al. ................ 379/58 |
| 5,311,572 A | | 5/1994 | Friedes et al. ................ 379/67 |
| 5,321,735 A | | 6/1994 | Breeden et al. |
| 5,325,418 A | | 6/1994 | McGregor et al. ............ 379/59 |
| 5,327,144 A | | 7/1994 | Stilp et al. .................. 342/387 |
| 5,329,578 A | | 7/1994 | Brennan et al. .............. 379/67 |
| 5,339,352 A | | 8/1994 | Armstrong et al. ........... 379/58 |
| 5,341,414 A | | 8/1994 | Popke |
| 5,353,335 A | | 10/1994 | D'Urso et al. ................ 379/67 |
| 5,359,182 A | | 10/1994 | Schilling |
| 5,359,642 A | | 10/1994 | Castro |
| 5,359,643 A | | 10/1994 | Gammino |
| 5,369,699 A | | 11/1994 | Page et al. |
| 5,384,825 A | | 1/1995 | Dillard et al. ............... 455/564 |
| 5,396,545 A | | 3/1995 | Nair et al. ............... 379/91.01 |
| 5,396,558 A | | 3/1995 | Ishiguro et al. |
| 5,404,580 A | | 4/1995 | Simpson et al. .............. 455/89 |
| 5,408,513 A | | 4/1995 | Busch et al. ............. 379/91.01 |
| 5,408,519 A | | 4/1995 | Pierce et al. |
| 5,408,682 A | * | 4/1995 | Ranner et al. |
| 5,412,726 A | | 5/1995 | Nevoux ....................... 380/24 |
| 5,438,615 A | | 8/1995 | Moen ......................... 379/144 |
| 5,440,621 A | | 8/1995 | Castro |
| 5,457,737 A | * | 10/1995 | Wen |
| 5,469,497 A | | 11/1995 | Pierce et al. |
| 5,485,505 A | | 1/1996 | Norman et al. ............. 455/419 |
| 5,502,761 A | | 3/1996 | Duncan et al. ............. 379/142 |
| 5,509,056 A | | 4/1996 | Ericsson et al. ............ 379/114 |
| 5,517,555 A | | 5/1996 | Amadon et al. |
| 5,517,559 A | | 5/1996 | Hayashi et al. |
| 5,550,897 A | | 8/1996 | Seiderman ................... 379/144 |
| 5,577,100 A | | 11/1996 | McGregor et al. ............ 379/58 |
| 5,579,376 A | | 11/1996 | Kennedy, III et al. ...... 455/433 |
| 5,583,918 A | | 12/1996 | Nakagawa ................... 455/409 |
| 5,592,535 A | | 1/1997 | Klotz ......................... 455/406 |
| 5,610,972 A | | 3/1997 | Emery et al. ................. 379/58 |
| 5,625,669 A | | 4/1997 | McGregor et al. ............ 379/58 |
| 5,722,067 A | | 2/1998 | Fougnies et al. ........... 455/406 |
| 5,732,346 A | | 3/1998 | Lazaridis et al. ........... 455/406 |
| 5,752,186 A | | 5/1998 | Malackowski et al. ..... 455/414 |
| 5,778,313 A | | 7/1998 | Fougnies |
| 5,790,636 A | | 8/1998 | Marshall |
| 5,815,816 A | * | 9/1998 | Isumi ........................ 455/458 |
| 5,826,185 A | | 10/1998 | Wise et al. |
| 5,850,599 A | * | 12/1998 | Seiderman ................... 455/406 |
| 5,854,975 A | | 12/1998 | Fougnies et al. ........... 455/408 |
| 6,157,823 A | | 12/2000 | Fougnies et al. ........... 455/406 |

* cited by examiner

PRE-PAID CELLULAR TELEPHONE SYSTEM

CROSS-REFERENCE TO RELATED APPLICATIONS

This application is a continuation of U.S. application Ser. No. 08/569,961, filed Dec. 8, 1995, now U.S. Pat. No. 5,778,313.

BACKGROUND OF THE INVENTION

This application relates to U.S. application Ser. No. 08/559,283, filed Nov. 15, 1995, which is a continuation-in-part of U.S. application Ser. No. 08/364,479, filed Dec. 23, 1994, now U.S. Pat. No. 5,722,067.

This invention relates to a cellular telephone system that allows only pre-paid subscribers to complete cellular telephone calls and, in particular, to a fraud resistant, pre-paid subscriber system that does not require special hardware connections to existing telephone networks.

A cellular telephone is a multi-frequency, portable transceiver, typically constructed with state of the art integrated circuits and capable of transmitting voice and digital data reliably almost anywhere in the world. Except for cost, a cellular telephone would likely be the appliance of choice for every person in the country. A cellular telephone costs at least three times as much, per month, as a "land line," i.e. as a telephone connected by wire to a public switching network. Despite the sophistication and quality of cellular telephones, the relatively high cost of a cellular telephone is not the telephone itself but the charges for the use of the telephone. Unfortunately, a significant portion of the cost of the system is due to theft of services and many techniques for detecting or thwarting theft have been proposed or implemented.

Some security systems rely on calling patterns to detect theft and such systems are prone to false positives, i.e. incorrectly identifying a legitimate call as an illegal call. Also, such systems require a number of calls to detect theft, which means that, if the calls were illegal, the cost of the calls must be absorbed by someone other than the caller. It is preferred to have a system that can detect theft of service as soon as the theft is attempted.

Another aspect of cost is the ability of a subscriber to pay for services compared to the subscriber's desire to use the services. Many subscribers sign up on the basis that the cellular telephone will only be used for emergencies and then find themselves defining "emergency" progressively more broadly. For many subscribers, it has been found beneficial to provide a pre-paid subscription that is self-limiting in the sense that the service is terminated when the payments are used up. U.S. Pat. No. 5,353,335 (D'Urso et al.) describes a modified network architecture in which a special platform for pre-paid calling service is connected to a node in a public, switched telephone network.

The above-identified, related application also describes a pre-paid, cellular system. The system disclosed in the application requires no modification to cellular telephones and, for outgoing calls, uses the automatic number identification (ANI) from each cellular telephone as a file link to identify and to authenticate the cellular telephone. Incoming calls are transferred to the mobile telephone switching office (MTSO) in which a number of lines are reserved for pre-paid subscribers. An incoming call is screened for a valid number and a positive, pre-paid balance by the subscription service and is then passed on to the subscriber. If the MTSO will not dedicate lines to pre-paid subscribers, a significant geographic area is unavailable to a specific but viable market.

A system requiring no modification to the cellular telephone is most easily implemented but the security of such a system is not as great as when the cellular telephone is modified. A problem with a system requiring modification to the cellular telephone is that physical access to the telephone is required.

In view of the foregoing, it is therefore an object of the invention to provide a cellular telephone system for pre-paid subscribers in which the system is transparent to existing telephone networks.

Another object of the invention is to provide a pre-paid subscription service that detects theft as it occurs and terminates the call.

A further object of the invention is to provide a pre-paid cellular telephone system that monitors both outgoing and incoming calls without the need for dedicated lines at an MTSO.

Another object of the invention is to provide a secure, pre-paid cellular telephone system requiring only software modification to existing cellular telephones to adapt the telephones to the system.

A further object of the invention is to provide a secure cellular telephone system in which modifications to a cellular telephone do not require physical access to the telephone.

SUMMARY OF THE INVENTION

The foregoing objects are achieved in this invention in which a pre-pay service unit uses pseudo-numbers to identify subscribers and substitutes actual numbers to complete a call after verification of authenticity and verification of a positive balance in the subscriber's account. The service unit and the cellular telephone exchange data in the process of authentication. The pseudo-numbers are combined with other data to provide a secure check of the identity of the cellular telephone and the authenticity of the call. It has been found that modifying a cellular telephone to share identification between the system and the telephone increases the security of the system and enables the operation of the system to be transparent to an MTSO.

In particular, for outgoing calls, the cellular telephone first transmits an "800" number and the ANI. The "800" number is the telephone number of a pre-pay service unit which receives the call. A switching network in the service unit then requests the dialed number, which the cellular telephone transmits with a security code and status data. If the data is authentic, the dialed digits are then passed to a local exchange carrier to complete the call. For incoming calls, a pseudo-number directs the call to a pre-pay service unit, which converts the pseudo-number to the actual telephone number of a subscriber's cellular telephone. After exchanging data with the subscriber's telephone, and after verifying authenticity and credit balance, the call is completed. Both incoming and outgoing calls can be monitored for charges and a call is terminated if a subscriber's balance reaches zero.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
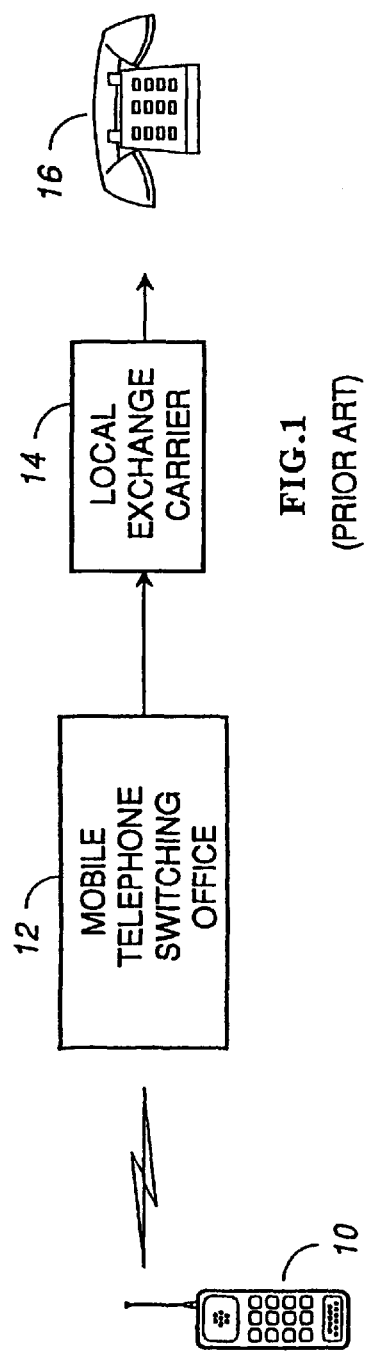
FIG. 1 illustrates an outgoing call from a cellular telephone in accordance with the prior art.

FIG. 1 illustrates an outgoing call from a cellular telephone to a conventional telephone. Cellular telephone 10 transmits the dialed number followed by the automatic number identification code that uniquely identifies telephone 10. This data is received by mobile telephone switching office 12, wherein the number is verified as a valid subscriber and, if so, the call is transferred to local exchange carrier 14. Local exchange carrier 14 switches the call to the appropriate land line connecting carrier 14 with telephone 16.

Figure 2:
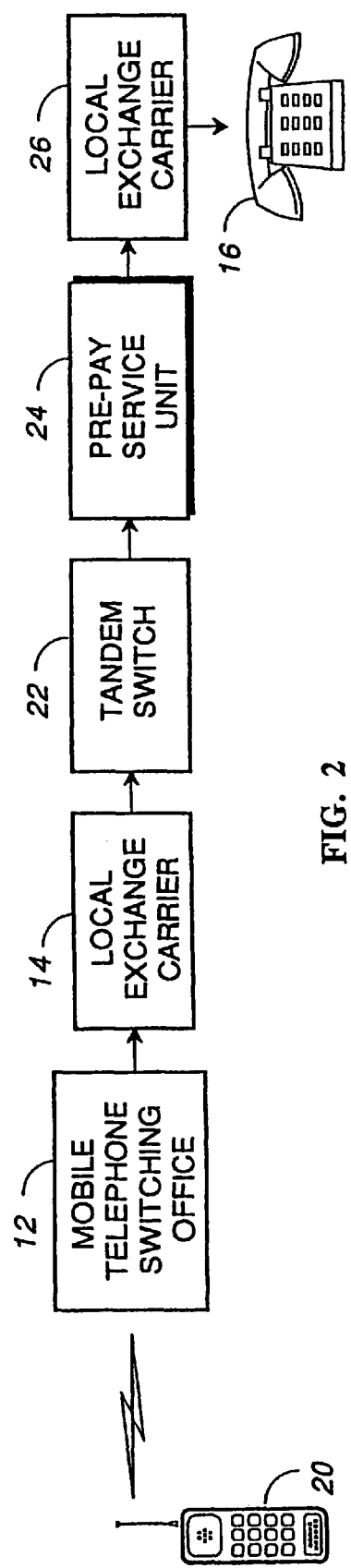
FIG. 2 illustrates an outgoing call from a cellular telephone in accordance with the invention.

FIG. 2 illustrates the path of an outgoing call from a pre-pay subscriber through a pre-pay service unit. The subscriber enters the desired destination telephone number on cellular telephone 20 and then presses the "send" button. Telephone 20 displays the dialed number but actually transmits a pseudo-number, viz. an "800" number to mobile telephone switching office 12, followed by the automatic number identification code of cellular telephone 20. The pseudo-number is the number of a pre-pay service unit. An "800" number is used to obtain the automatic number identification code of telephone 20.

Switching office 12 passes the call through local exchange carrier 14 and tandem switch 22 to pre-pay service unit 24. Service unit 24 recognizes the automatic number identification as a pre-pay subscriber and transmits back to cellular telephone 20 a request for the number actually dialed. Cellular telephone 20 responds with the dialed number, which passes through switching office 12, carrier 14, switch 22, and service unit 24 to local exchange carrier 26, which switches the call to the appropriate land for connection to telephone 16. Thus, the number initially transmitted by a pre-paid subscriber is the number of a pre-pay service unit, which then completes the call with the dialed number. In the process, the pre-pay service unit monitors the calls and the account of the subscriber to be sure that the call is genuine and that the account of the subscriber has a positive balance.

In FIGS. 1–4, a pre-pay subscriber is indicated by a cellular telephone symbol and a non pre-pay subscriber is represented by a symbol of a conventional telephone. This is solely for the sake of clarity. A pre-pay subscriber can call anyone, including another subscriber. An outgoing call from a subscriber's telephone is always a call to an "800" number and, therefore, always includes the dialed number and the automatic number identification code. This characteristic of cellular telephone service is used to direct all outgoing calls to the pre-pay service unit, enabling the pre-pay service unit to monitor all subscriber calls for authenticity and appropriate charges.

Figure 3:
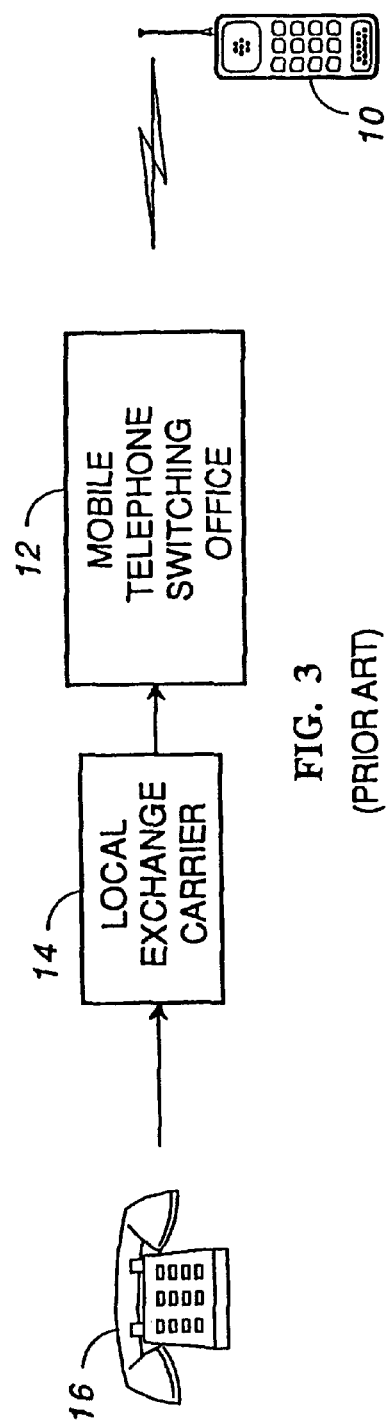
FIG. 3 illustrates an incoming call to a cellular telephone in accordance with the prior art.

FIG. 3 illustrates an incoming call to a cellular telephone in accordance with the prior art. In this case, the user dials the destination number on telephone 16 and the number is recognized as a cellular telephone number by local exchange carrier 14. Carrier 14 transfers the call to mobile telephone switching office 12, which then authenticates the call and pages cellular telephone 10.

Figure 4:
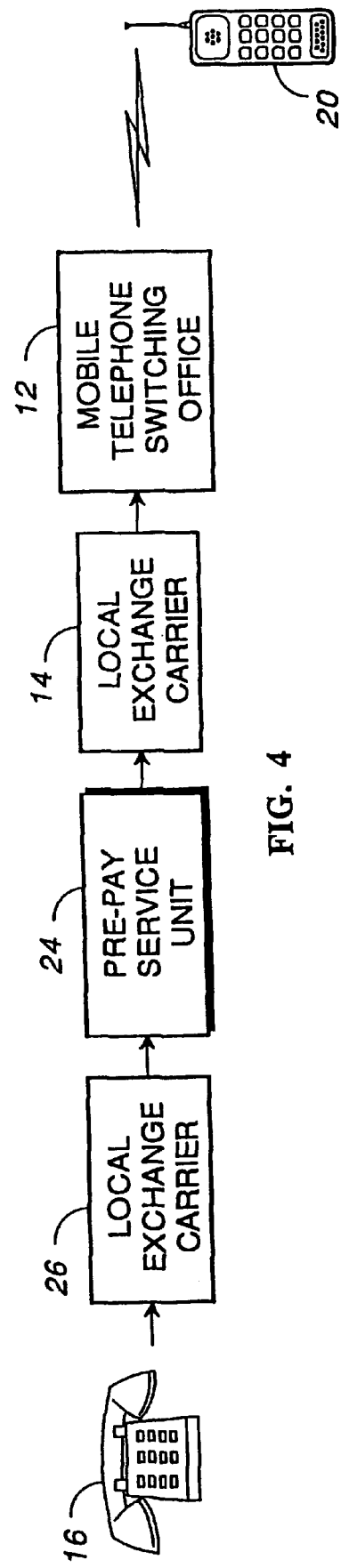
FIG. 4 illustrates an incoming call to a cellular telephone in accordance with the invention.

In accordance with the invention, the actual telephone number of the cellular phone is known only by the pre-pay service unit and a pseudo-number is provided to the public, including the subscriber. The pseudo-number is actually a number belonging to the pre-pay service unit. Thus, as illustrated in FIG. 4, a user dials the pseudo-number on telephone 16 and local exchange carrier 26 recognizes the number as belonging to pre-pay service unit 24. Upon receipt of the incoming call, pre-pay service unit 24 looks up the actual number of cellular telephone 20 in a conversion table and transfers the number to local exchange carrier 14. Carrier 14 recognizes the number as a cellular number and passes the call to mobile telephone switching office 12 which authenticates the number and pages cellular telephone 20.

For both incoming and outgoing calls, the pre-pay service unit is interposed in the path of a call and converts the dialed number into a second number for completing the telephone call. The pre-pay service unit is independent of the mobile telephone switching office and is connected into the system by way of land lines or its own cellular connections.

Figure 5:
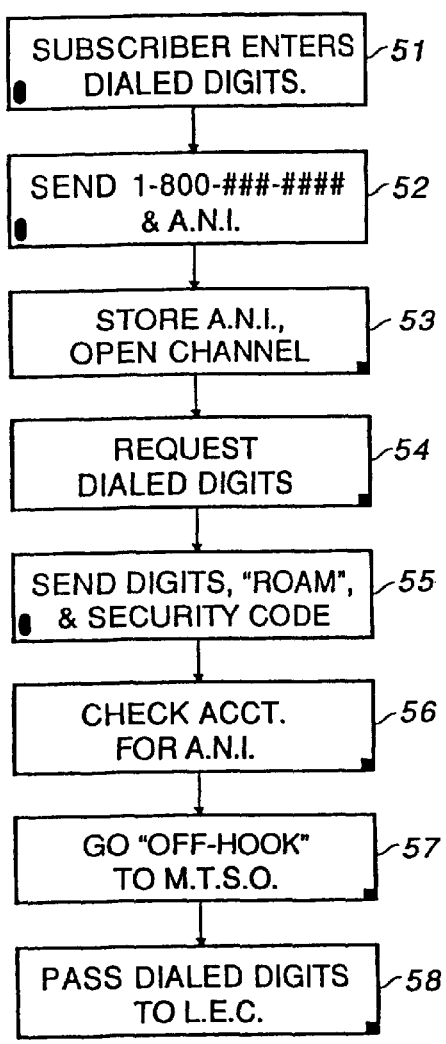
FIG. 5 is a flow chart of an outgoing call in accordance with a preferred embodiment of the invention.
Figure 6:
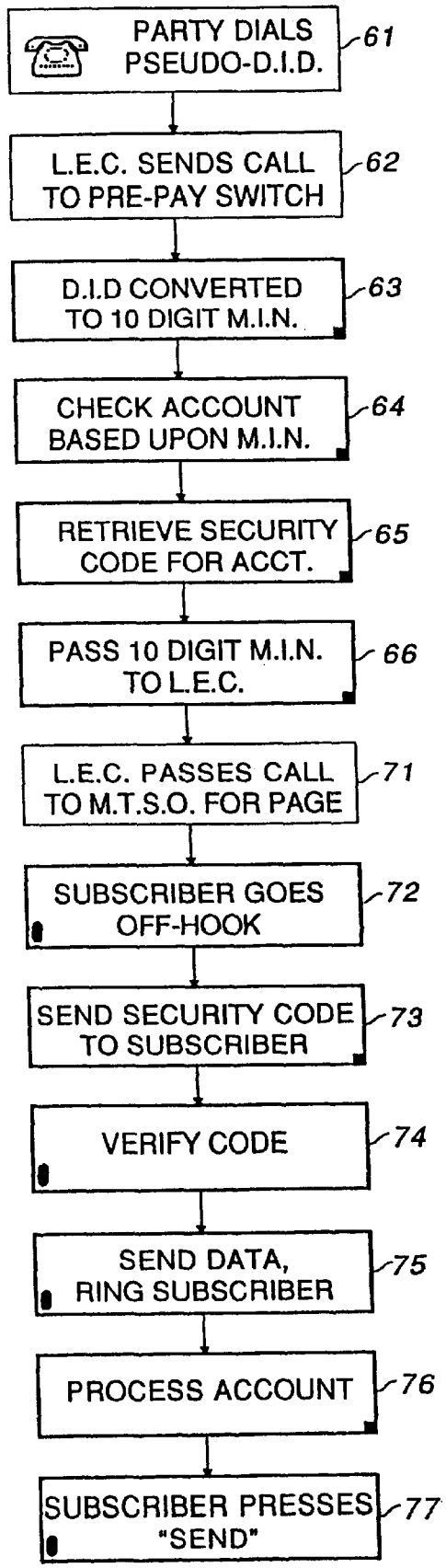
FIG. 6 is a flow chart of an incoming call in accordance with a preferred embodiment of the invention.

While intercepting telephone calls to or from a subscriber, the pre-pay service unit exchanges data with the subscriber cellular telephone prior to completing the call. The data exchange between the pre-pay service unit and a subscriber's cellular telephone is illustrated in FIGS. 5 and 6. In FIGS. 5 and 6, a small dot in the lower left hand corner of a rectangle indicates an action by the subscriber's cellular telephone. A small dot in the lower right hand corner of a rectangle indicates an action taken by the pre-pay service unit. A rectangle with a dot in neither location represents an action taken by a public switching network.

FIG. 5 is a flow chart of an outgoing call from a subscriber's cellular telephone. In step 51, the subscriber dials the desired phone number. If the cellular telephone has a display, the dialed number is displayed. In step 52, the subscriber's cellular telephone actually transmits an "800" number followed by the automatic number identification code. The telephone call is passed to the pre-pay service unit, which stores the automatic number identification and opens a channel to the subscriber's telephone. The pre-pay service unit then requests the dialed number (step 54) and the subscriber's telephone responds (step 55) with the number actually dialed and other data, such as roaming information, and a security code. "Roaming" is the situation in which the cellular telephone is outside of the service area of the subscriber. Service within the area is considered a local call and service outside the area is subject to additional charges for "roaming" and long distance.

After receiving the data from the subscriber's telephone, the pre-pay service unit uses the automatic number identification to check the subscriber's account for a positive balance and verifies the automatic number identification code with the security code transmitted by the subscriber's telephone. If there is a positive balance and the codes are authentic, the pre-pay service unit sends an "off hook" signal to the mobile telephone switching office, step 57, and transfers the call to the local exchange carrier, step 58, completing the call.

FIG. 6 illustrates the exchange of information between the pre-pay service unit and a subscriber's cellular telephone for an incoming call. In step 61, a party dials what he believes is the actual telephone number of a subscriber's cellular telephone. In step 62, the local exchange carrier recognizes the number as belonging to the pre-pay service unit and transfers the call accordingly. In step 63, the pre-pay service unit looks up the pseudo-number in a table and replaces the pseudo-number with the actual number of the subscriber's telephone. In step 64, the pre-pay service unit checks the subscriber's account for a positive balance, based upon the actual number of the subscriber, also known as the mobile identification number (MIN).

In step 65, the pre-pay service unit retrieves a security code for the subscriber's account and then passes the actual telephone number to a local exchange carrier (step 66). The carrier passes the call to a mobile telephone switching office for paging the subscriber's cellular telephone. upon receipt of the page, the subscriber's telephone goes off-hook, in what is known as auto-answer mode, but does not ring. In other words, the subscriber's cellular telephone must have the features of auto answer and silent ring. These features are used in many, but not all, commercially available cellular telephones. To be compatible with the invention, a cellular telephone must have both features.

After the subscriber's telephone goes off-hook, the pre-pay service unit sends a security code to the subscriber's telephone, step 73. The subscriber's telephone verifies the code, step 74, sends a verification code to the pre-pay service unit and provides an audible ring, step 75. The pre-pay service unit verifies the code and monitors the account of the subscriber for call duration and billing. The subscriber "answers" the telephone call by pressing "send", step 77.

The exchange of data between the subscriber's telephone and the pre-pay service unit makes it very difficult to steal services. If desired, the data transferred between the subscriber's telephone and the prepay service unit can be scrambled or encrypted. For example, in step 55 (FIG. 5) the DID number, roam code, and security code need not be sent consecutively but can be mixed in a predetermined sequence and sent as a single block of data. Similarly, the subscriber's telephone can verify the code (step 74, FIG. 6) as it is received from the pre-pay service unit or it can re-order the digits in a predetermined manner prior to verification. Alternatively, one can use a checksum to verify the digits or a checksum of selected digits for verification. The particular manner for scrambling or encrypting data is a matter of choice.

Figure 7:
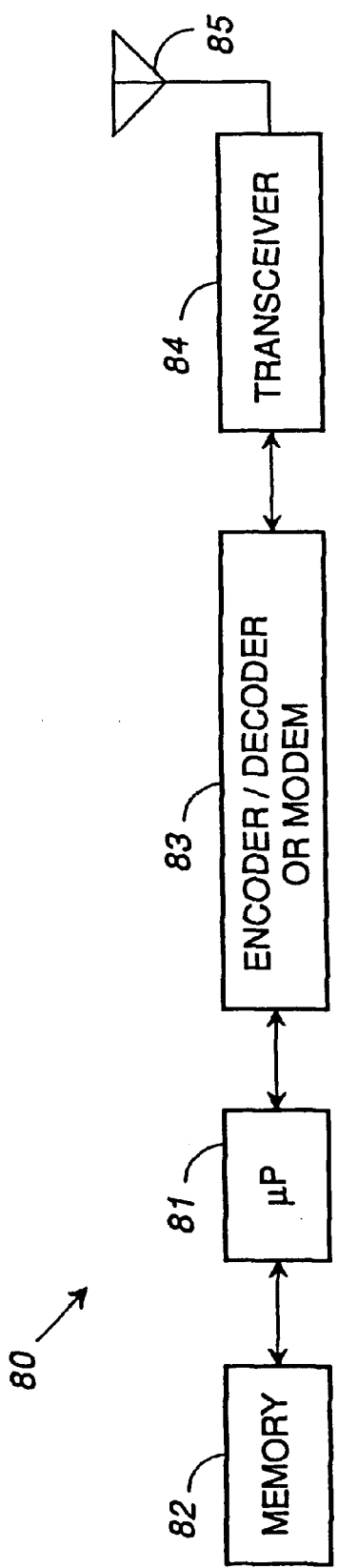
FIG. 7 is a block diagram of a cellular telephone suitable for use in the invention.

FIG. 7 illustrates a cellular telephone suitable for use in the invention. In particular, cellular telephone 80 includes microprocessor 81 coupled to memory 82 and to an I/O device such as encoder 83 and transceiver 84. Antenna 85 is coupled to transceiver 84 for emitting the high frequency radio waves that couple cellular telephone to the mobile telephone switching office. Most cellular telephones transmit data in what is known as multiple frequency (MF) or dual tone multiple frequency (DTMF) form. In accordance with the invention, a cellular telephone, in addition to providing silent ring and auto answer, includes at least a decoder for MF/DTMF signals.

A DTMF encoder/decoder handles numbers in base 10, i.e. the digits 0–9, as opposed to binary numbers, the digits 0–1. In a preferred embodiment of the invention, a cellular telephone includes a modem for transmitting binary data to and from microprocessor 81 through transceiver 84. some commercially available cellular telephones include an encoder, a decoder, and a modem. For such telephones, only the software and the data stored in memory 82 need be modified to implement the invention. Transmitting a pseudo-number, waiting for a request for data, comparing data with stored data, and sending a code stored in memory are tasks that are easily implemented in software whether microprocessor 81 has a rich instruction set or a reduced instruction set.

An advantage of the invention over the prior art is the ability to encode a subscriber's cellular telephone remotely. Because the telephone includes a modem, data can be transferred over telephone lines to the subscriber's telephone, for example to change security codes or to modify the programming within the telephone. Not only is physical access not required but this capability enables one to sell telephones through a national chain of stores and activate the telephones remotely. Similarly, if a subscriber moves, the subscriber's "home" cell can be changed remotely to the new location. The memory in the cellular telephone need only include an EAROM (electrically alterable, read-only memory).

Figure 8:
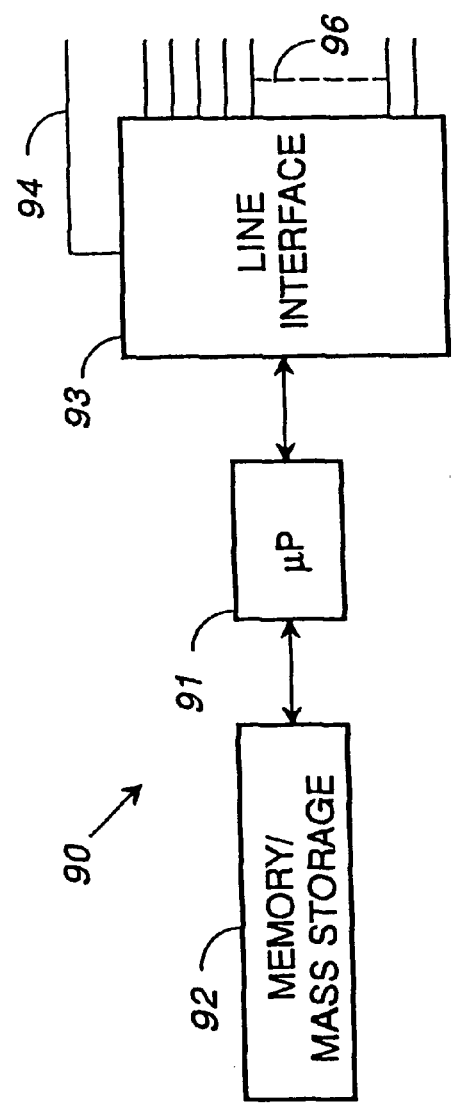
FIG. 8 is a block diagram of the apparatus used by the pre-pay service unit.

FIG. 8 is a block diagram of a pre-pay service unit. unit 90 includes microprocessor 91 connected to memory/mass storage 92 and line interface 93. Memory/mass storage 92 contains the codes, account information, and tables for translating incoming calls to the appropriate destination telephone number and for monitoring the accounts of subscribers. Line interface 93 includes appropriate circuitry for coupling land lines to microprocessor 91, encoding and decoding MF/DTMF signals, and modems for transferring data to and from subscribers. Printed circuit boards or cards are commercially available for performing these functions and a array of cards is used in unit 90 for connecting lines 96 to a public switching network. Lines 96 can be implemented by wire, optical fiber, microwave links, or a cellular network. Line 94 is a "WATS" or "800" line. More than one "800" number can be used, depending upon loading.

A system incorporating the invention operates conventionally for billing, busy signals, inadequate pre-paid balance, and the like. A distinct advantage of the invention is that attempted theft of services is immediately detected because of the data exchange between a subscriber's cellular telephone and the pre-pay service unit. Referring to FIG. 4, for example, if someone obtained the actual dial-in number is for telephone 20, the pre-pay service unit cannot be by-passed because telephone 20 awaits a security code before proceeding. Without the code, the call is terminated and is counted as suspect in telephone 20. In a preferred embodiment of the invention a fixed number of suspect calls, e.g. three, disables telephone 20 until the telephone is physically returned to the pre-pay service provider for correction. Similarly, without the security code, a call cannot be placed from telephone 20.

The invention thus provides a cellular telephone system for pre-paid subscribers in which the system is transparent to existing telephone networks and can monitor both outgoing and incoming calls without the need for dedicated lines at an MTSO. Theft is detected as soon as an attempt is made and the call is terminated. The invention can be implemented with commercially available cellular telephones and switching equipment, requiring only software modification.

Having thus described the invention, it will be apparent to those of skill in the art that various modifications can be made within the scope of the invention. For example, a rotating coding system can be used within the cellular telephone. That is, for step 55 (FIG. 5), one of several possible codes is transmitted for each outgoing call. Both the telephone and the pre-pay service unit have the same table of codes and increment through the table in step. Attempted thefts of service will very likely send the wrong code. The tables and codes are different for each subscriber.

What is claimed as the invention is:

1. A method, performed by a wireless communication device, of facilitating pre-authorized wireless communications, the method comprising routing a call request through a pre-authorized wireless service provider by transmitting a predetermined destination number in place of a subscriber-specified destination number, in which the transmission of the predetermined destination number is transparent to the subscriber, and in which the pre-authorized wireless service provider comprises a pre-pay service unit.

2. The method of claim 1 in which the predetermined destination number corresponds to a pre-authorized wireless service provider.

3. The method of claim 2 in which the predetermined destination number comprises a toll-free number.

4. The method of claim 1 in which the subscriber-specified destination number corresponds to a party with whom communications are desired.

5. The method of claim 1 in which the routing further comprises:
   buffering the subscriber-specified destination number; and
   transmitting the buffered subscriber-specified number to the pre-authorized wireless service provider.

6. The method of claim 5 in which transmitting the buffered subscriber-specified number comprises:
   receiving a request from the pre-authorized wireless service provider; and
   sending the buffered subscriber-specified number in response to the received request.

7. The method of claim 1 further comprising transmitting a wireless communication device identifier with the predetermined destination number.

8. The method of claim 7 in which the wireless communication device identifier and the predetermined destination number are transmitted serially.

9. The method of claim 7 in which the predetermined destination number facilitates connection to the pre-authorized wireless service provider and the wireless communication device identifier enables the pre-authorized wireless service provider to determine the wireless communication device's identity.

10. The method of claim 1 in which the wireless communication device comprises a cellular telephone.

11. A method, performed by a wireless communication device, of facilitating pre-authorized wireless communications, the method comprising
   routing a call request through a pre-authorized wireless service provider by transmitting a predetermined destination number in place of a subscriber-specified destination number, in which the pre-authorized wireless service provider comprises a pre-pay service unit;
   in which the routing further comprises buffering the subscriber-specified destination number, and transmitting the buffered subscriber-specified number to the pre-authorized wireless service provider; and
   further comprising transmitting security information to the pre-authorized wireless service provider.

12. The method of claim 11 in which the transmitted security information enables the pre-authorized wireless service provider to verify the wireless communication device's authenticity.

13. A method, performed by a wireless communication device, of facilitating pre-authorized wireless communications, the method comprising
   routing a call request through a pre-authorized wireless service provider by transmitting a predetermined destination number in place of a subscriber-specified destination number, in which the pre-authorized wireless service provider comprises a pre-pay service unit;
   in which the routing further comprises buffering the subscriber-specified destination number, and transmitting the buffered subscriber-specified number to the pre-authorized wireless service provider; and
   further comprising transmitting roaming information to the pre-authorized wireless service provider.

14. A method, performed by a wireless communication device, of facilitating pre-authorized wireless communications, the method comprising routing a call request through a pre-authorized wireless service provider by transmitting a predetermined destination number in place of a subscriber-specified destination number, and further comprising transmitting a wireless communication device identifier with the predetermined destination number, in which the wireless communication device identifier comprises an ANI, and in which the pre-authorized wireless service provider comprises a pre-pay service unit.

15. A method, performed by a wireless communication device, of facilitating pre-authorized wireless communications, the method comprising routing a call request through a pre-authorized wireless service provider by transmitting a predetermined destination number in place of a subscriber-specified destination number, and further comprising transmitting a wireless communication device identifier with the predetermined destination number, in which the wireless communication device identifier comprises information other than an ANI, and in which the pre-authorized wireless service provider comprises a pre-pay service unit.

16. A method, performed by a wireless communication device, of facilitating pre-authorized wireless communications, the method comprising routing a call request through a pre-authorized wireless service provider by transmitting a predetermined destination number in place of a subscriber-specified destination number, in which the pre-authorized wireless service provider comprises a pre-pay service unit.

17. Software, stored in a computer-readable medium, comprising instructions to cause a wireless communications device to perform the following operations:
   receive a subscriber-specified destination number;
   buffer the received subscriber-specified destination number;
   transmit a predetermined destination number in place of the buffered subscriber-specified destination number; and
   transmit the buffered subscriber-specified destination number to the pre-authorized wireless service provider comprising a pre-pay service unit;
   in which transmission of the predetermined destination number is transparent to a subscriber operating the wireless communication device.

18. The software of claim 17 in which transmission of the predetermined destination number occurs in response to a trigger event.

19. The software of claim 18 in which the trigger event comprises a depression of a SEND key on a wireless communications device.

20. The software of claim 17 in which the received subscriber-specified destination number corresponds to subscriber input on a keypad of the wireless communications device.

21. The software of claim 17 in which the received subscriber-specified destination number corresponds to a party to be contacted.

22. The software of claim 17 in which the predetermined destination number corresponds to a pre-authorized wireless service provider.

23. The software of claim 17 further comprising instructions to perform the following operations:
  receive a request for the subscriber-specified destination number from the pre-authorized wireless service provider; and
  transmit the buffered subscriber-specified destination number to the pre-authorized wireless service provider in response to the received request.

24. Software, stored in a computer-readable medium, comprising instructions to cause a wireless communications device to perform the following operations:
  receive a subscriber-specified destination number;
  buffer the received subscriber-specified destination number; and
  transmit a predetermined destination number in place of the buffered subscriber-specified destination number;
  further comprising instructions to perform the following operations:
    receive a request for the subscriber-specified destination number from a pre-authorized wireless service provider; and
    transmit the buffered subscriber-specified destination number to the pre-authorized wireless service provider comprising a pre-pay service unit in response to the received request; and
  further comprising instructions to transmit security information to the pre-authorized wireless service provider in response to the received request, the security information comprising data that enables the pre-authorized wireless service provider to verify the authenticity of the wireless communication device.

25. Software, stored in a computer-readable medium, comprising instructions to cause a wireless communications device to perform the following operations:
  receive a subscriber-specified destination number;
  buffer the received subscriber-specified destination number; and
  transmit a predetermined destination number in place of the buffered subscriber-specified destination number;
  further comprising instructions to perform the following operations:
    receive a request for the subscriber-specified destination number from a pre-authorized wireless service provider comprising a pre-pay service unit; and
    transmit the buffered subscriber-specified destination number to the pre-authorized wireless service provider in response to the received request; and
    further comprising instructions to transmit roaming information to the pre-authorized wireless service provider in response to the received request.

26. Software, stored in a computer-readable medium, comprising instructions to cause a wireless communications device to perform the following operations:
  receive a subscriber-specified destination number;
  buffer the received subscriber-specified destination number; and
  transmit a predetermined destination number in place of the buffered subscriber-specified destination number;
  further comprising instructions to transfer a wireless communication device identifier with the predetermined destination number, the wireless communication device identifier comprising data that enables a pre-authorized wireless service provider comprising a pre-pay service unit to identify the wireless communication device.

27. The software of claim 26 in which the wireless communication device identifier comprises an ANI.

28. A method, performed by a wireless communication device, of facilitating pre-authorized wireless communications, the method comprising:
  receiving from a subscriber a destination number specifying a party to be called;
  buffering the destination number received from the subscriber;
  transmitting a predetermined pre-authorized wireless service provider's number in place of the buffered destination number;
  receiving a request for the subscriber-specified destination number from the pre-authorized wireless service provider; and
  transmitting the buffered destination number to the pre-authorized wireless service provider in response to the received request;
  in which transmission of the predetermined pre-authorized wireless service provider's number is transparent to a subscriber operating the wireless communication device,
  and in which the pre-authorized wireless service provider comprises a pre-pay service unit.

29. A method, performed by a wireless communication device, of facilitating pre-authorized wireless communications, the method comprising:
  transparently receiving from a pre-authorized wireless service provider security information corresponding to an incoming call request;
  verifying the received security information; and
  selectively notifying a subscriber of an incoming call only after the security information is verified.

30. The method of claim 29 in which the selective notification comprises notifying the subscriber if the received security information is verified to be valid.

31. The method of claim 29 further comprising, upon verification of the received security information, transmitting verification information to the pre-authorized wireless service provider.

32. The method of claim 29 in which the transparent reception of the security information comprises going off-hook without alerting the subscriber.

33. Software, stored in a computer-readable medium, comprising instructions to cause a wireless communications device to perform the following operations:
  receive transparently from a pre-authorized wireless service provider security information corresponding to an incoming call request;
  verify the received security information; and
  selectively notify a subscriber of an incoming call only after the security information is verified.

34. The method of claim 33 in which the selective notification comprises notifying the subscriber if the received security information is verified to be valid.

35. The software of claim 33 further comprising instructions to transmit verification information to the pre-authorized wireless service provider upon verification of the received security information indicating acceptance.

36. The software of claim 33 in which the transparent reception of the security information comprises executing instructions to go off-hook without alerting the subscriber.

37. A method, performed at a pre-authorized wireless service provider, of facilitating pre-authorized wireless communications, the method comprising:
   receiving a call from a wireless communication device directed to a predetermined destination number, the call including information that identifies the wireless communication device;
   accessing a pre-paid account corresponding to the wireless communication device; and
   transparently obtaining a subscriber-specified destination number from the identified wireless communication device;
   in which the transmission of the predetermined destination number is transparent to a subscriber operating the wireless communication device.

38. The method of claim 37 in which the predetermined destination number corresponds to the pre-authorized wireless service provider.

39. The method of claim 37 in which the subscriber-specified destination number corresponds to a party with whom communications are desired.

40. The method of claim 37 further comprising confirming that the identified wireless communication device corresponds to a subscriber of the pre-authorized wireless service provider.

41. The method of claim 37 in which transparently obtaining the subscriber-specified number comprises communicating with the wireless communication device in a manner that is unnoticeable to a subscriber.

42. The method of claim 37 further comprising:
   determining a status of an account corresponding to the identified wireless communication device; and
   based on a result of the determining, selectively passing the subscriber-specified destination number to a public network.

43. The method of claim 37 further comprising passing the subscriber-specified destination number to a public network.

44. A method, performed at a pre-authorized wireless service provider, of facilitating pre-authorized wireless communications, the method comprising:
   receiving a call from a wireless communication device directed to a predetermined destination number, the call including information that identifies the wireless communication device;
   accessing a pre-paid account corresponding to the wireless communication device; and
   transparently obtaining a subscriber-specified destination number from the identified wireless communication device;
   in which the information that identifies the wireless communication device comprises an ANI.

45. A method, performed at a pre-authorized wireless service provider, of facilitating pre-authorized wireless communications, the method comprising:
   receiving a call from a wireless communication device directed to a predetermined destination number, the call including information that identifies the wireless communication device;
   accessing a pre-paid account corresponding to the wireless communication device; and
   transparently obtaining a subscriber-specified destination number from the identified wireless communication device; and
   further comprising receiving security information from the identified wireless communication device.

46. The method of claim 45 further comprising verifying authenticity of the wireless communication device based on the security information received.

47. The method of claim 46 further comprising selectively passing the subscriber-specified destination number to a public network based on a result of the authenticity verification.

48. The method of claim 47 in which the subscriber-specified destination number is not passed to the public network if the authenticity of the wireless communication device is not verified.

49. A method, performed at a pre-authorized wireless service provider, of facilitating pre-authorized wireless communications, the method comprising:
   receiving a call from a wireless communication device directed to a predetermined destination number, the call including information that identifies the wireless communication device;
   accessing a pre-paid account corresponding to the wireless communication device; and
   transparently obtaining a subscriber-specified destination number from the identified wireless communication device; and further comprising:
      determining a status of an account corresponding to the identified wireless communication device; and
      based on a result of the determining, selectively passing the subscriber-specified destination number to a public network
      in which the subscriber-specified destination number is not passed to the public network if the account contains insufficient funds.

50. The method of claim 49 further comprising receiving security information from the identified wireless communication device.

51. The method of claim 50 further comprising verifying authenticity of the wireless communication device based on the security information received.

52. The method of claim 51 further comprising selectively passing the subscriber-specified destination number to a public network based on a result of the authenticity verification.

53. The method of claim 52 in which the subscriber-specified destination number is not passed to the public network if the authenticity of the wireless communication device is not verified.

54. A method, performed at a pre-authorized wireless service provider, of facilitating pre-authorized wireless communications, the method comprising:
   receiving in connection with a call request a pseudo-number from a calling party;
   based on the received pseudo-number, determining a subscriber destination number of a wireless communication device associated with the pre-authorized wireless service provider;
   passing the subscriber destination number to a public network to complete the call request.

55. The method of claim 54 in which the public network comprises a local exchange carrier (LEC) or a mobile telephone switching office (MTSO) or both.

56. The method of claim 54 in which the pseudo-number comprises a destination number for the pre-authorized wireless service provider.

57. The method of claim 54 in which the pseudo-number uniquely identifies the subscriber.

58. The method of claim 54 in which the subscriber destination number comprises a Mobile Identification Number (MIN).

59. The method of claim 54 in which determining the subscriber destination number comprises using the received pseudo-number as an index to a look-up table.

60. The method of claim 54 further comprising, prior to passing the subscriber destination number to the public network, confirming a status of an account associated with the subscriber destination number.

61. The method of claim 60 in which confirming the account status comprises determining if the account contains sufficient funds.

62. The method of claim 61 further comprising prohibiting completion of the call request if the account contains insufficient funds.

63. The method of claim 54 further comprising transmitting a security code to the wireless communication device via the public network.

64. The method of claim 63 further comprising receiving from the wireless communication device a verification code corresponding to the transmitted security code.

65. The method of claim 64 comprising confirming the verification code and aborting the call request if the verification code does not confirm successfully.

66. The method of claim 54 further comprising monitoring a status of an account associated with the wireless subscriber device during the call.

67. The method of claim 54 in which the pseudo-number is distinct from the subscriber destination number.

* * * * *